(12) United States Patent
Rahnama-Moghaddam et al.

(10) Patent No.: US 11,615,166 B2
(45) Date of Patent: Mar. 28, 2023

(54) SYSTEM AND METHOD FOR CLASSIFYING IMAGE DATA

(71) Applicant: Booz Allen Hamilton Inc., McLean, VA (US)

(72) Inventors: Arash Rahnama-Moghaddam, Fairfax, VA (US); Andre Tai Nguyen, Columbia, MD (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 17/130,254

(22) Filed: Dec. 22, 2020

(65) Prior Publication Data

US 2021/0133513 A1 May 6, 2021

Related U.S. Application Data

(62) Division of application No. 16/669,717, filed on Oct. 31, 2019.

(51) Int. Cl.
| | |
|---|---|
| *G06F 18/241* | (2023.01) |
| *G06N 3/08* | (2006.01) |
| *G06N 20/20* | (2019.01) |
| *G06N 20/10* | (2019.01) |
| *G06V 10/764* | (2022.01) |
| *G06V 10/82* | (2022.01) |
| *G06N 3/045* | (2023.01) |

(52) U.S. Cl.
CPC .......... *G06F 18/241* (2023.01); *G06N 3/045* (2023.01); *G06N 3/08* (2013.01); *G06N 20/10* (2019.01); *G06N 20/20* (2019.01); *G06V 10/764* (2022.01); *G06V 10/82* (2022.01)

(58) Field of Classification Search
CPC ........ G06T 2207/30168; G06T 7/0002; G06K 9/6268; G06N 20/20; G06N 20/10; G06N 3/0454; G06N 3/08
USPC ........................................................ 338/224
See application file for complete search history.

(56) References Cited

U.S. PATENT DOCUMENTS

| | | |
|---|---|---|
| 5,542,006 A | 7/1996 | Shustorovich et al. |
| 5,963,966 A | 10/1999 | Mitchell et al. |
| 10,402,699 B1 | 9/2019 | Chen et al. |
| (Continued) | | |

OTHER PUBLICATIONS

Kupyn et al, DeblurGan: Blind Motion Deblurring Using Conditional Adversarial Networks, CVPR 2018 (Year: 2018).*

(Continued)

*Primary Examiner* — Mark Roz
(74) *Attorney, Agent, or Firm* — Buchanan Ingersoll & Rooney PC

(57) ABSTRACT

An exemplary device for classifying an image includes a receiving unit that receives image data. The device also includes a hardware processor including a neural network architecture to extract a plurality of features from the image data, filter each feature extracted from the image data, concatenate the plurality of filtered features to form an image vector, evaluate the plurality of concatenated features in first and second layers of a plurality of fully connected layers of the neural network architecture based on an amount of deviation in the features determined at each fully connected layer, and generate a data signal based on an output of the plurality of fully connected layers. A transmitting unit sends the data signal to a peripheral or remote device.

13 Claims, 5 Drawing Sheets

(56) References Cited

U.S. PATENT DOCUMENTS

| | | | |
|---|---|---|---|
| 10,936,916 | B1 | 3/2021 | Rahnama-Moghaddam et al. |
| 2012/0323118 | A1 | 12/2012 | Menon Gopalakrishna et al. |
| 2017/0124415 | A1 | 5/2017 | Choi et al. |
| 2017/0154425 | A1 | 6/2017 | Pierce et al. |
| 2018/0173997 | A1* | 6/2018 | Shen .................. G06K 9/628 |
| 2019/0206095 | A1 | 7/2019 | Xing et al. |
| 2019/0251396 | A1* | 8/2019 | Geraci ............... G06K 9/4628 |

OTHER PUBLICATIONS

Tripathi, Correction By Projection: Denoising Images with Generative Adversarial Networks, arXiv 2018 (Year: 2018).*
Kupyn "DeblurGAN: Blind Motion Deblurring Using Conditional Adversarial Networks", CVPR 2018 (Year: 2018).*
Szegedy "Going Deeper with Convolutions", CVPR 2015 (Year: 2015).*
Brownlee "A Gentle Introduction to Generative Adversarial Networks", Generative Adversarial Networks, Jun. 2019 (Year: 2019).*
Wang "Perceptual Adversarial Networks for Image-to-Image Transformation", IEEE 2018 (Year: 2018).*
A Short Introduction to Generative Adversarial Networks, https://sthalles.github.io/ (Year: 2017).*
Mihai Zaharescu, "Image Deblurring: Challenges and Solutions", ResearchGate 2013 (Year: 2013).*
O'Leary, Deblurring Digital Images, University of Maryland, 2012 (Year: 2012).*
Laugros, "Are Adversarial Robustness and Common Perturbation Robustness Independent Attributes ?" ICCVW Sep. 2019 (Year: 2019).*
P. Georgiev et al., "Low-resource Multi-task Audio Sensing for Mobile and Embedded Devices via Shared Deep Neural Network Representations", Proceedings of the ACM on Interactive, Mobile, Wearable and Ubiquitous Technologies, Sep. 2017. (21 pages).
International Search Report and the Written Opinion of the International Searching Authority (Forms PCT/ISA/220, PCT/ISA/210 and PCT/ISA/237) dated Feb. 2, 2021, by the International Bureau of U.S. Patent Office in corresponding International Application No. PCT/US2020/058131. (11 pages).
Notice of Allowance dated Jan. 22, 2021, by the U.S. Patent and Trademark Office in U.S. Appl. No. 16/669,717. (16 pages).
J. Kos et al., "Adversarial Examples for Generative Models", 2018 IEEE Symposium on Security and Privacy Workshops, pp. 36-42.

* cited by examiner

SYSTEM AND METHOD FOR CLASSIFYING IMAGE DATA

CROSS REFERENCE TO RELATED APPLICATIONS

This application is a divisional of U.S. application Ser. No. 16/669,717, filed Oct. 31, 2019, incorporated herein by reference in its entirety.

FIELD

The present disclosure relates to the classification of image data and more particularly to the classification of perturbed image data.

BACKGROUND

Deep learning is the main force behind the recent rise in artificial intelligence (AI) solutions. Deep learning algorithms are capable of providing a performance on par with, if not exceeding, human performance in tasks such as classification, regression and prediction in fields such as computer vision, natural language processing and voice recognition. While deep neural networks have demonstrated great success in solving complex problems, they have also shown to be quite vulnerable to adversarial attacks. Adversarial attacks usually appear in the form of subtle perturbations to the input data which can deceive an AI model into making incorrect decisions. One challenging aspect is the fact that these small perturbations, while capable of completely fooling the AI model, are imperceptible to the human eye. This factor indicates that most deep learning models are not reliable and can be easily penetrated. Consequently, an approach that can detect adversarial inputs before they get to the deep learning model are needed.

SUMMARY

An exemplary device for classifying an image is disclosed, comprising: a receiving unit configured to receive image data; a hardware processor configured with a neural network architecture to extract a plurality of features from the image data, filter each feature extracted from the image data, concatenate the plurality of filtered features to form an image vector, evaluate the plurality of concatenated features in first and second layers of a plurality of fully connected layers of the neural network architecture based on an amount of deviation in the features determined at each fully connected layer, and generate a data signal based on an output of the plurality of fully connected layers; and a transmitting unit configured to send the data signal to a peripheral or remote device.

An exemplary method for classifying image data in an image processor is disclosed, the method comprising: receiving image data in a receiving unit of the image processor; feeding the image data to a processing device of the image processor, the processing device being configured with a neural network architecture, which includes a residual network and a detection network; extracting, in the residual network of the processing device, a plurality of features from the image data; filtering, in a plurality of convolutional layers of the detection network of the processing device, each feature extracted in the residual network by sending each extracted feature through one of the plurality of convolutional layers; concatenating, in the detection network of the processing device, the plurality of filtered features output from the plurality of convolutional layers; evaluating, in a plurality of fully connected layers of the detection network of the processing device, the concatenated features from the plurality of convolutional layers at first and second layers of the plurality of fully connected layers based on an amount of deviation in the features determined at each fully connected layer; and classifying the image data, in the processing device of the image processor, based on an evaluation result.

An exemplary method for training an image processing device to detect perturbed images is disclosed, the image processing device having a hardware processor encoded with a neural network architecture, the method comprising: receiving, in a receiving unit of the image processing device, a first an image dataset; extracting, via the neural network architecture of the hardware processor, image features from the first image dataset; concatenating, via the neural network architecture of the hardware processor, the image features of the image dataset to form an image vector training the neural network architecture to identify an unclean image by evaluating the concatenated image features of the image vector at first and second layers of a plurality of fully connected layers in the neural network architecture based on an amount of deviation in the image features from image features learned from one or more clean images as determined at each fully connected layer; classifying, via the neural network architecture, the image dataset based on the evaluation; determining, via the neural network architecture, whether a classification result is correct; and adjusting one or more nodes of the neural network architecture, one or more connections between respective pairs of nodes of the neural network architecture, or a combination of the one or more nodes and the one or more connections based on the classification result.

BRIEF DESCRIPTION OF THE DRAWINGS

Exemplary embodiments are best understood from the following detailed description when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Exemplary embodiments of the present disclosure are directed to a detection device or system which can determine whether an input data point has been manipulated (e.g., altered). The embodiments described herein have the capacity to distinguish these altered data points from non-altered (e.g., clean) data points. As a result, the exemplary embodiments of the present disclosure can improve the strength and reliability of an AI model by making sure that the inputs to the AI model are authentic and come from a distribution of clean data that the AI model expects.

Figure 1:
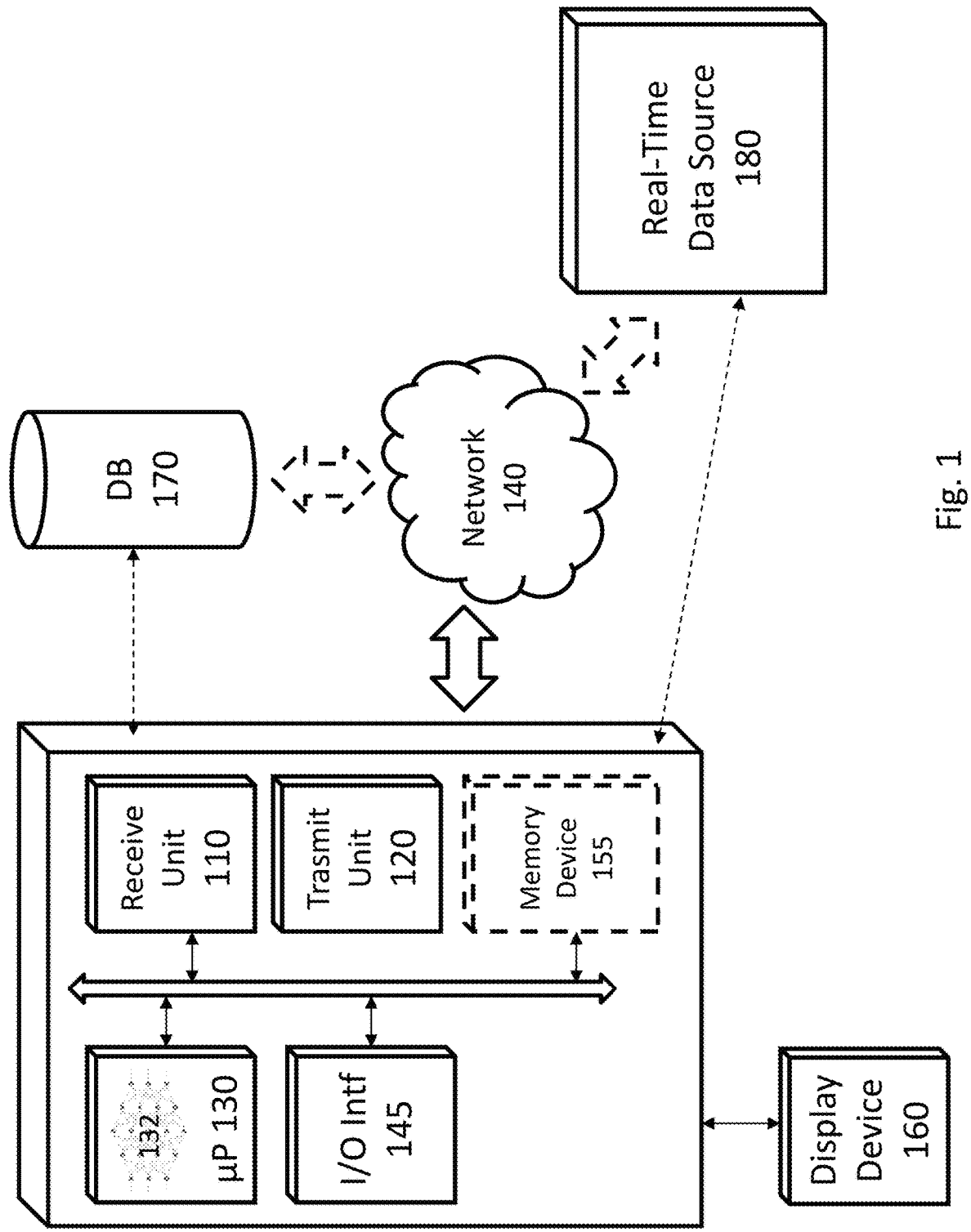
FIG. 1 illustrates a system structure in accordance with an exemplary embodiment of the present disclosure.

FIG. 1 illustrates a system structure in accordance with an exemplary embodiment of the present disclosure.

As shown in FIG. 1, an exemplary computing device 100 for classifying an image can include a receiving unit 110, a transmitting unit 120, a hardware processor 130, and an input/output (I/O) interface 140. The computing device 100 can be a standalone computing device or one included in system or network of computing devices. The computing device 100 can be configured as desired to include features of an image processing device.

The receiving unit 110 can include a combination of hardware and software components and be configured to receive image data. The receiving unit 110 can include a hardware component such as an antenna, a network interface (e.g., an Ethernet card), a communications port, a PCMCIA slot and card, or any other suitable component or device as desired. The receiving unit 110 can be encoded with software or program code for receiving signals and/or data packets encoded with image data from another device, such as a database, image sensor, image processor or other suitable device as desired. The receiving unit 110 can be connected to other devices via a wired or wireless network or via a wired or wireless direct link or peer-to-peer connection without an intermediate device or access point. The hardware and software components of the receiving unit 110 can be configured to receive image data according to one or more communication protocols and data formats. For example, the receiving unit 110 can be configured to communicate over a network 140, which may include a local area network (LAN), a wide area network (WAN), a wireless network (e.g., Wi-Fi), a mobile communication network, a satellite network, the Internet, fiber optic cable, coaxial cable, infrared, radio frequency (RF), another suitable communication medium as desired, or any combination thereof. During a receive operation, the receiving unit 110 can be configured to identify parts of the received data via a header and parse the data signal and/or data packet into small frames (e.g., bytes, words) or segments for further processing at the hardware processor 130.

The transmitting unit 120 can be configured to receive data from the processor 124 and assemble the data into a data signal and/or data packets according to the specified communication protocol and data format of a peripheral device or remote device to which the data is to be sent. The transmitting unit can include any one or more of hardware and software components for generating and communicating the data signal over the network 140 and/or via a direct wired or wireless link to a peripheral or remote device. The transmitting unit 120 can be configured to transmit information according to one or more communication protocols and data formats as discussed in connection with the receiving unit 110.

According to an exemplary embodiment of the present disclosure the receiving unit 110 and the transmitting unit 120 can be separate devices or combined into a single device.

The hardware processor 130 can be configured with a neural network architecture 132 to extract a plurality of features from the image data, filter each feature extracted from the image data, concatenate the plurality of filtered features to form an image vector, evaluate the plurality of concatenated features in first and second layers of a plurality of fully connected layers of the neural network architecture based on an amount of deviation in the features determined at each fully connected layer, and generate a data signal based on an output of the plurality of fully connected layers.

According to exemplary embodiments of the present disclosure, the hardware processor 130 can be a special purpose or a general purpose processing device encoded with program code or software for performing the exemplary functions and/or features disclosed herein. The hardware processor 130 can be connected to a communications infrastructure 150 including a bus, message queue, or network, multi-core message-passing scheme, for communicating with other components of the computing device 100, such as the receiving unit 110, the transmitting unit 120, and the I/O interface 145. The hardware processor 130 can include one or more processing devices such as a microprocessor, central processing unit, microcomputer, programmable logic unit or any other suitable hardware processing devices as desired.

The I/O interface 145 can be configured to receive the signal from the hardware processor 130 and generate an output suitable for a peripheral device via a direct wired or wireless link. The I/O interface 145 can include a combination of hardware and software for example, a processor, circuit card, or any other suitable hardware device encoded with program code, software, and/or firmware for communicating with a peripheral device such as a display device 160, printer, audio output device, or other suitable electronic device or output type as desired.

The neural network architecture 132 of the hardware processor 130 is configured as a deep learning neural network in which each layer identifies a specified feature and higher-level feature than a previous layer. The neural network architecture 132 includes a plurality of layers, where a plurality of sub-layers can be grouped to include a residual network 134 and a detection network 136.

Figure 2:
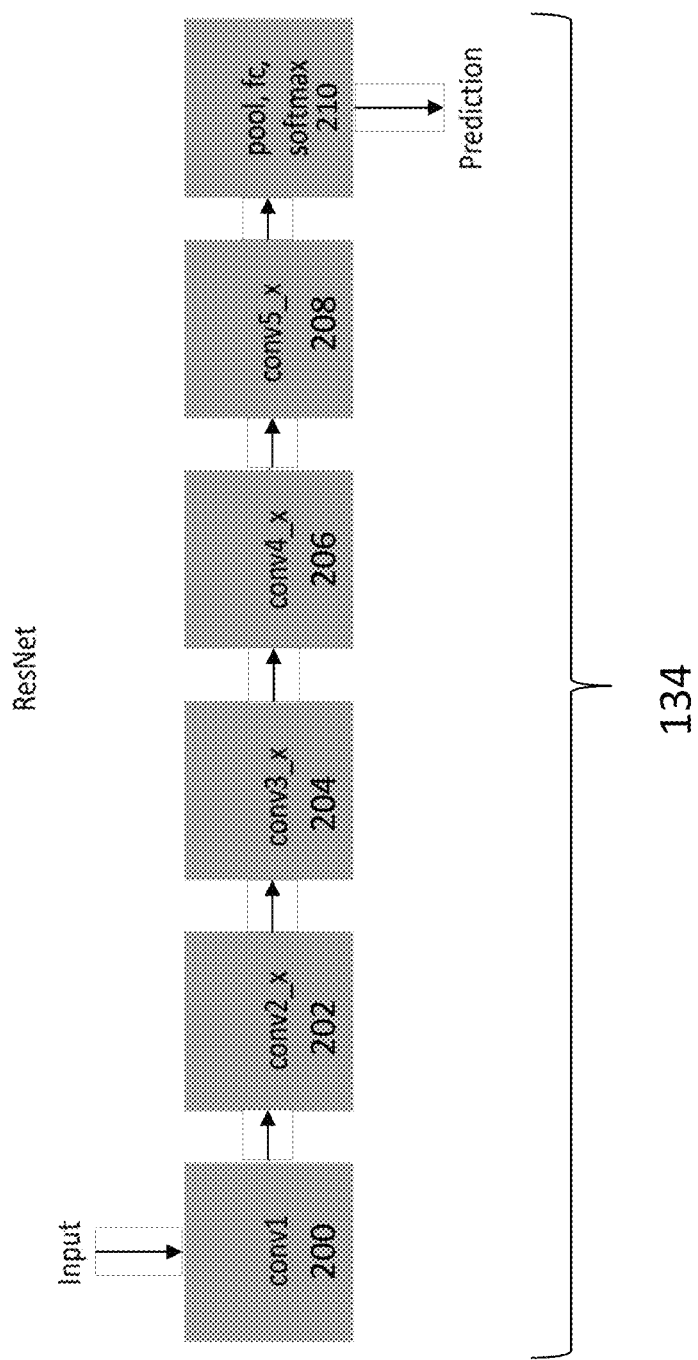
FIG. 2 illustrates a flow diagram of a residual network in accordance with a known implementation as described in the present disclosure.

FIG. 2 illustrates a flow diagram of a residual network 134 in accordance with a known implementation as described in the present disclosure. The residual network 134 is a known artificial neural network designed to reduce the received image into a form that is easier to process without losing features that allow for a precise and/or accurate prediction or identification of the image. The residual network includes skip connections between some of the layers, and particularly when training the network so that layers which do not improve performance of the network can be passed. For example, rather than each layer feeding into the next layer in sequence, the skip connections allow a layer to feed not only into the next layer but also into layers 2 to 3 hops downstream in the sequence. In this manner each layer can learn concepts of not only the previous layer, but also the concepts of layers that feed previous layers. The skipped layers can be restored to being active as the neural network is further trained or learns concerning the features being discriminated at each layer. As shown in FIG. 2, a known residual network 134 can include plural layers conv1 (200) to conv5_x (208). The input is received at conv1 (200) and at each layer through conv5_x (208) a feature a higher-level feature is extracted from the image. For example in the context of an image of including a human face, at layer conv1 (200) can be trained and further learn to extract edges from the image, layer conv2_x (202) can be trained and further learn to extract shapes, layer conv3_x (204) can be trained and further learn to extract objects from the image, layer conv4_x (206) can be trained and further learn to extract a nose or other facial features, for example, from the image, and layer conv5_x (208) can be trained and further learn to extract a face from the image. The residual network 134 can include one or more of a pooling or normalization layer, fully connected layers, and softmax layer (210). These additional layers are used to further process the image features and generate a prediction.

Figure 3:
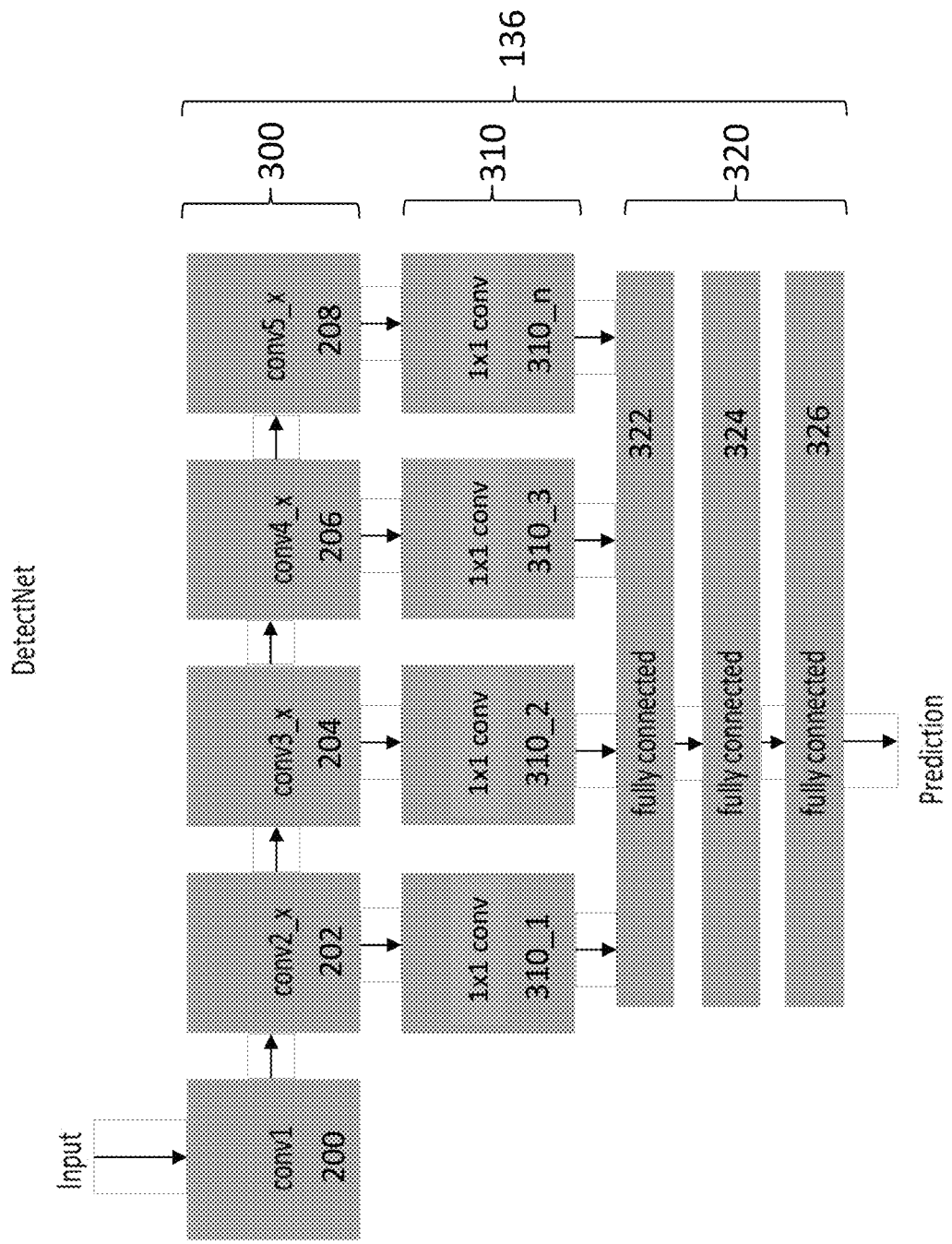
FIG. 3 illustrates a flow diagram of a detection network in accordance with an exemplary embodiment of the present disclosure.

FIG. 3 illustrates a flow diagram of a detection network in accordance with an exemplary embodiment of the present disclosure. The detection network 136 is connected to receive the features extracted from the image via the residual network 300. As shown in FIG. 3, the residual network 300 according to an exemplary embodiment of the present disclosure is modified to include at least a filtering process between features extraction and prediction of the image. According to an exemplary embodiment of the present disclosure the pooling, fully connected layers, and softmax layers can be removed. It should be understood, however, that FIG. 3 is only an exemplary representation of the plurality of layers in the residual network 300. The residual network can be configured to include any number of n layers as needed for classifying an image according to the described exemplary embodiments as desired. The detection network 136 includes a plurality of convolutional layers 310_n for filtering the extracted features. Each convolutional layer 310_n is a 1×1 convolutional layer connected to receive an extracted image feature from one of the plurality of layers of the residual network 300. That is, the convolutional layers 310_n perform a matrix operation on each pixel value in the extracted image feature until each element (i.e., pixel) of the entire image feature has been traversed. As shown in FIG. 3, the outputs of the convolutional layers 310_n are linked or concatenated in sequence and input into a plurality of fully connected layers 320 for evaluating the concatenated features. The concatenation of the outputs from the plurality of convolutional layers 300 forms a vector of features that is fed into the plurality of fully connected layers 310.

In the fully connected layers 320 each element of a layer receives an input from every element of the previous layer. As shown in FIG. 3, the exemplary fully connected layers 310 include three layers. The first layer 322 is an input layer in which each node receives a filtered image feature from each of the concatenated layers 310_1 to 310_n. The output of every node of the input layer 322 is fed to the input of every node in the second layer 324. Further, the output of every node in the second layer 324 is passed to the input of every node in the third layer, or output layer 326. The output layer 326 holds composite and aggregated information from the residual network 300 and the plurality of convolutional layers 310_n. The output of the third layer 326 is a binary decision or data value that indicates whether an input is a clean or unclean image. In particular, as the vector of features passes from the first layer 322 to the third layer 326 of the fully connected layers 320, an amount of deviation between the vector of features and expected features in the image the neural network 132 has learned from training. If the deviation between the vector of features and the learned features increases by a learned threshold as the image passes from the input layer 322 to the output layer 326 then the output layer 326 generates a value indicative of the input image being an unclean image. This means that one or more elements (i.e., pixels) in the image has a perturbation or noise deviation above the applicable threshold such that the pixel is determined to be different or have different information from the training image. However, if the deviation does not exceed the applicable threshold, then the output layer 326 generates a value indicative of the input image being a clean image or an image that does not include noisy or perturbed pixels.

Figure 4:
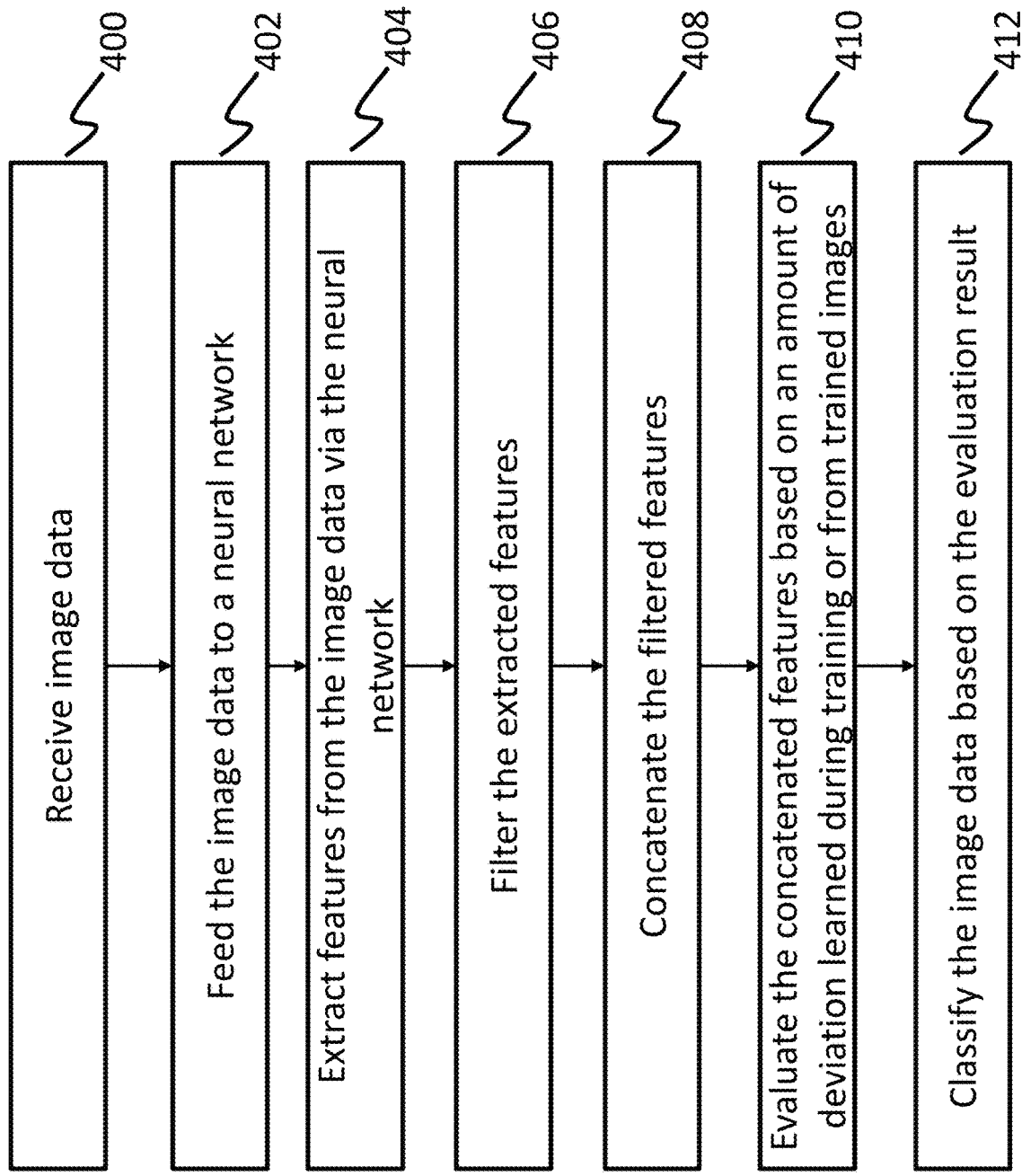
FIG. 4 illustrates a method for classifying an image in accordance with an exemplary embodiment of the present disclosure.

FIG. 4 illustrates a method for classifying an image in accordance with an exemplary embodiment of the present disclosure.

As shown in FIG. 4, during an operation for classifying an image the computing device 100 receives image data in the receiving unit 110 (Step 400). The image data can be received from any of a number of sources. For example, according to an exemplary embodiment, the image data can be received in real-time from a real-time data source 180 such as a video camera, infrared sensor, thermal imaging sensor, or any other suitable image sensing device as desired. That is, the image data can be embedded or encoded in a live streamed data signal or a live stream of data packets. According to another exemplary embodiment, the image data can be received from the image sensor via a video processing platform or as raw data received directly from the image sensor. According to yet another exemplary embodiment, the image data can be received from information or data stored in a database 170 or a suitable memory device as desired.

The receiving unit 110 feeds the image data to the hardware processor 130 (e.g., processing device) of the computing device 100 (Step 402). As already discussed, the hardware processor 130 being configured with a neural network architecture 132, which includes a residual network 300 and a detection network 136. The hardware processor 130 passes the image data to the residual network 300 to extract a plurality of features from the image data (Step 404). Each layer in the residual network is connected to pass an extracted feature to a dedicated convolutional layer 310_n. The plurality of convolutional layers 310_n filter each feature received from the plurality of layers in the residual network 300, respectively (Step 406). Each of the plurality of convolutional layers 310_n is a 1×1 convolutional layer configured to filter or convolve each pixel in the extracted image features of each residual layer 300.

The outputs of the plurality of convolutional layers 310_n, which include a plurality of filtered features, are concatenated (Step 408). For example, the outputs of the convolutional layers 310_n are linked in sequence to form a vector of features. The vector of features formed by the concatenation of the convolutional layers 310_n is passed to the plurality of fully connected layers 320 of the detection network 136. In the plurality of fully connected layers 320, the concatenated features from the plurality of convolutional layers 310_n are evaluated at first and second layers 322, 324 based on an amount of deviation in the features learned during training or from one or more training images as determined at each of the first and second layers 322, 324 (Step 410). A third layer 326 of the fully connected layers 320 serves as the output layer, which classifies the image data based on an evaluation result (Step 412). For example, the output layer 326 generates a binary value indicating one or more pixels of that image data is unclean if the amount of deviation is above the applicable threshold such that one or more of the pixels, individually or in combination, is determined to be different or have different information from the training image. The output layer 326 generates a binary value or other suitable data value indicating that the image data is clean, i.e., without any perturbations or noise deviations above the applicable threshold, or unclean, if the amount of deviation exceeds the applicable threshold. It should be noted that an image can be subject to evaluation using more than one threshold, e.g., preset or learned, that is applicable to the image or a context of the image. The applicable threshold(s) can be set and/or adjusted by the neural network architecture 132 based on the learning obtained during training or from training images.

Figure 5:
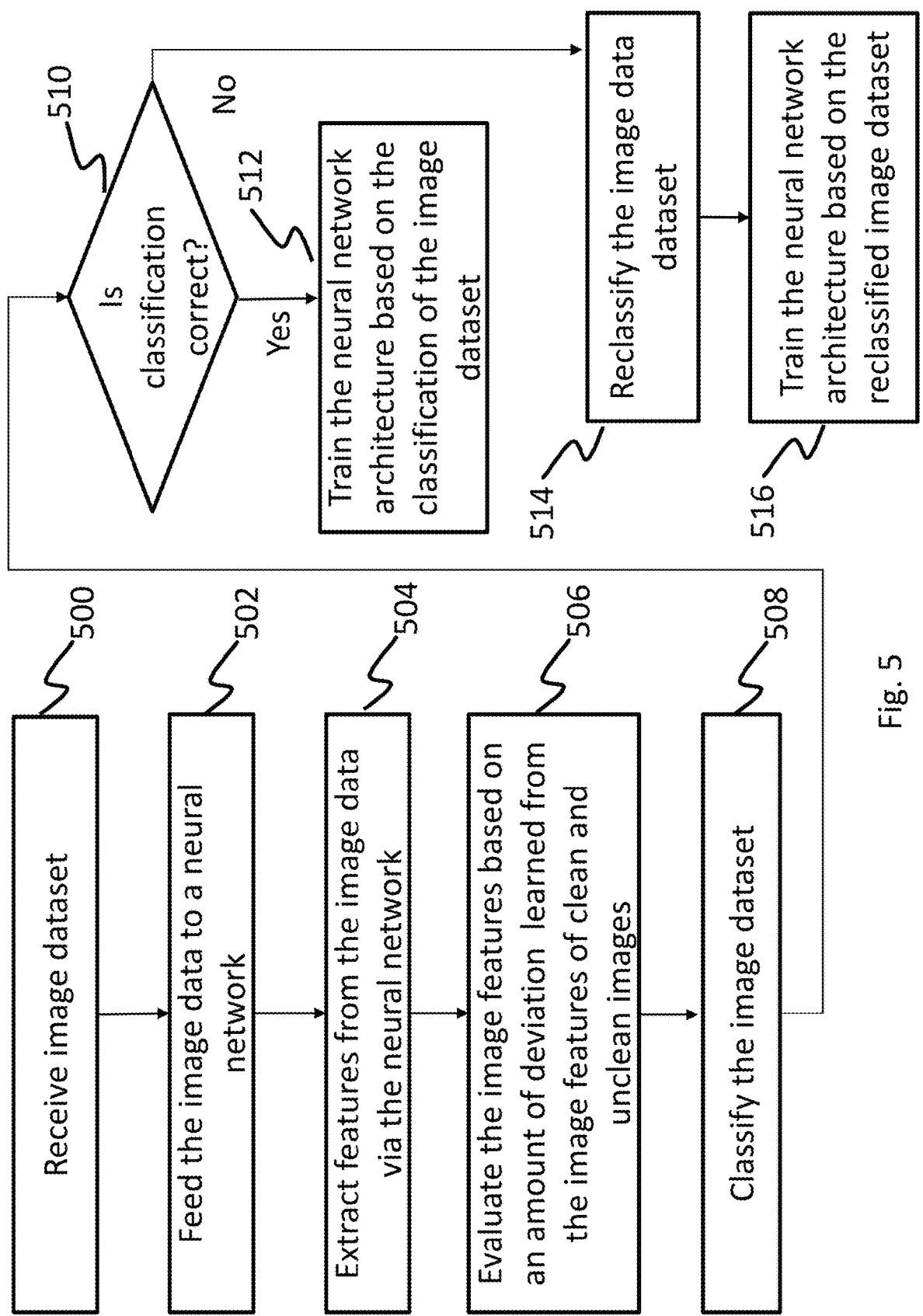
FIG. 5 illustrates a method for training a deep learning neural network to classify images having perturbations in accordance with an exemplary embodiment of the present disclosure.

Whether the computing device 100 can properly classify image data as being clean or unclean is based on how well the neural network architecture 132 of the hardware processor 130 is trained. FIG. 5 illustrates a method for training a deep learning neural network to classify images with and without perturbations in accordance with an exemplary embodiment of the present disclosure.

As shown in FIG. 5, a receiving unit 110 of a computing device 100 configured as an image processing device receives a first image dataset from a database 170 (Step 500). The image data set is passed to the hardware processor 130 of the computing device 100. The hardware processor 130 via the neural network architecture 132 extracts image features from the first image dataset (Step 502). Through the convolutional layers 310_n of the neural network architecture 132, the extracted image features are filtered and the filtered results are concatenated to form an image vector (Step 504). The image features of the image vector are evaluated at first and second layers 322, 324 of the plurality of fully connected layers 320 of the neural network architecture 132 based on an amount of deviation learned from image features of one or more clean or unclean images on which the neural network was trained (Step 506). The image data set is classified based on a binary output of the third layer 326 of the plurality of fully connected layers 320 (Step 508). The output of the third layer 326 specifies whether the amount of deviation is below or meets/exceeds an applicable threshold. A determination is made either manually by user (e.g., operator) evaluation or automatically through further analysis and/or evaluation by the hardware processor 130, on whether the classification result is correct (Step 510). If the classification result is correct, the neural network architecture can be trained according to the initial determination by adjusting one or more nodes of the neural network architecture, one or more connections between respective pairs of nodes of the neural network architecture, or a combination of the one or more nodes and the one or more connections (Step 512). The adjustment of the nodes and/or node connections also involves setting and/or adjusting the applicable threshold for determining whether an image is clean or unclean. If the classification result is deemed to be incorrect, then the image data set is reclassified according to the correct classification (Step 514) and the neural network architecture is trained to recognize the image data set according to the reclassification (Step 516). For example, if the output of the third layer 326 specifies that the image data set is below the specified threshold then the image data set is classified as a clean image. Upon further analysis, however, and using additional considerations (e.g., information, data, parameters, etc.) relevant to the image data set and/or object, subject, or features in the image data set, a user or the hardware processor 130 determines that the image data is an unclean image such that the classification is incorrect. According to an exemplary embodiment, the additional information on which the further analysis is based can be input to the computing device 100 by the user or obtained from a remote computing device over the network 140. The user or hardware processor 130 can then reclassify the image data and initiate training of the neural network architecture based on the reclassified image data.

The computer program code for performing the specialized functions described herein can be stored on a non-transitory computer usable medium, such as the memory devices for the computing device 100, which may be memory semiconductors (e.g., DRAMs, etc.) or other tangible non-transitory means for providing software to the computing device 100. The computer programs (e.g., computer control logic) or software may be stored in a memory device 155 resident on/in the computing device 100. The computer programs may also be received via a communications interface. Such computer programs, when executed, may enable the computing device 100 to implement the present methods and exemplary embodiments discussed herein. Accordingly, such computer programs may represent controllers of the computing device 100. Where the present disclosure is implemented using software, the software may be stored in a computer program product or non-transitory computer readable medium and loaded into the computing device 100 using a removable storage drive, an interface, a hard disk drive, or communications interface, where applicable.

The hardware processor 130 of the computing device 100 can include one or more modules or engines configured to perform the functions of the exemplary embodiments described herein. Each of the modules or engines may be implemented using hardware and, in some instances, may also utilize software, such as corresponding to program code and/or programs stored in memory. In such instances, program code may be interpreted or compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the computing device 100 to perform the functions disclosed herein. It will be apparent to persons having skill in the relevant art that such processes result in the computing device 100 being a specially configured computing device uniquely programmed to perform the functions described above.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method for training an image processing device to detect perturbed images, the image processing device having a hardware processor encoded with a neural network architecture, the method comprising:

receiving, in a receiving unit of the image processing device, an image dataset;

extracting, via the neural network architecture of the hardware processor, image features from the image dataset;

concatenating, via the neural network architecture of the hardware processor, the image features of the image dataset to form an image vector;

training the neural network architecture to identify an unclean image by evaluating the concatenated image features of the image vector at first and second layers of a plurality of fully connected layers in the neural network architecture based on an amount of deviation in the concatenated image features from reference image features learned from one or more clean images as determined at each fully connected layer, wherein the unclean image is a clean image that is modified by a human adversary;

classifying, via the neural network architecture, the image dataset based on the evaluation;

determining, via the neural network architecture, whether a classification result is correct including reclassifying the image dataset if the classification result is determined to be incorrect; and adjusting one or more connections between respective pairs of nodes of the neural network architecture to skip at least one layer of the neural network architecture or restore the connection to a skipped layer based on the classification result.

2. The method of claim 1, comprising:

filtering the extracted image features prior to the image features being concatenated.

3. The method of claim 1, wherein the neural network architecture includes a third layer connected to at least the first and second layers, the method comprising:

classifying the image dataset based on a binary output of the third layer.

4. The method of claim 3, wherein the binary output of the third layer is based on a comparison of the amount of deviation to a specified threshold.

5. The method of claim 4, wherein the comparison determines whether the amount of deviation is below the specified threshold.

6. The method of claim 4, wherein the comparison determines whether the amount of deviation meets the specified threshold.

7. The method of claim 4, wherein the comparison determines whether the amount of deviation exceeds the specified threshold.

8. The method of claim 4, wherein adjustment of the one or more node connections comprises:

adjusting the specified threshold for determining whether an image of the image data set is dean or unclean.

9. The method of claim 1, comprising:

if the classification result is determined to be incorrect, then the image data set is reclassified according to an identified correct classification.

10. The method of claim 9, comprising:

training the neural network to recognize the image data set according to the reclassification.

11. The method of claim 3, wherein the third layer holds composite and aggregated information from the first and second layers for assessing an amount of deviation between the image vector of features and expected features in the image.

12. The method of claim 11, wherein the expected features are learned from training.

13. The method of claim 1, wherein one or more data points of the unclean image include noise introduced by the human adversary.

* * * * *